US005608372A

United States Patent [19]

Yamaguchi

[11] Patent Number: 5,608,372

[45] Date of Patent: Mar. 4, 1997

[54] FUSE LOCKING CONSTRUCTION FOR FUSE BOX

[75] Inventor: Jun Yamaguchi, Yokkaichi, Japan

[73] Assignee: Sumitomo Wiring Systems, Ltd., Yokkaichi, Japan

[21] Appl. No.: 576,399

[22] Filed: Dec. 21, 1995

Related U.S. Application Data

[63] Continuation of Ser. No. 245,644, May 18, 1994, abandoned.

[30] Foreign Application Priority Data

Jun. 8, 1993 [JP] Japan .............................. 5-030729 U

[51] Int. Cl.$^6$ .......................... H01H 85/02; H01H 85/52; H01R 13/68; H02B 1/26

[52] U.S. Cl. .......................... 337/198; 337/190; 337/216; 439/621; 361/833; 361/626; 361/642

[58] Field of Search .................................... 337/186, 187, 337/190, 198, 216, 234, 236, 194, 195; 439/250, 366, 621, 622, 830; 361/642, 644, 646, 833, 837

[56] References Cited

U.S. PATENT DOCUMENTS

| | | | |
|---|---|---|---|
| D. 321,683 | 11/1991 | Marach | D13/173 |
| 4,238,140 | 12/1980 | Cairns . | |
| 4,391,485 | 7/1983 | Urani | 339/191 |
| 4,560,227 | 12/1985 | Bukala | 339/147 |
| 4,592,613 | 6/1986 | Tong | 339/147 P |
| 4,772,219 | 9/1988 | Falchetti | 439/490 |
| 4,836,802 | 6/1989 | Phillips | 439/622 |
| 5,145,414 | 9/1992 | Oikawa . | |
| 5,171,293 | 12/1992 | Umemoto | 439/622 |
| 5,215,479 | 6/1993 | Araki et al. . | |
| 5,221,217 | 6/1993 | Oikawa . | |
| 5,474,475 | 12/1995 | Yamaguchi | 439/621 |

*Primary Examiner*—Leo P. Picard
*Assistant Examiner*—Stephen T. Ryan
*Attorney, Agent, or Firm*—Greenblum & Bernstein P.L.C.

[57] ABSTRACT

A fuse locking construction for a fuse box, in which a fuse having a fuse member insert molded in a base made of synthetic resin and a pair of terminal plates projecting out of the base from the fuse member is inserted into a fuse mounting portion so as to be locked to the fuse mounting portion. The fuse locking construction includes a pair of locking projections which are, respectively, provided at opposite ends of an insertion mouth of the fuse box for the fuse mounting portion and retain opposite upper ends of the base at the time of completion of insertion of the fuse into the fuse mounting portion so as to lock the fuse to the fuse mounting portion; and a guide groove for guiding each of the terminal plates of the fuse in a direction for inserting the fuse into the fuse mounting portion or drawing the fuse out of the fuse mounting portion, which is formed on each of the locking projections.

4 Claims, 4 Drawing Sheets

FUSE LOCKING CONSTRUCTION FOR FUSE BOX

This application is a continuation, of application Ser. No. 08/245,644, filed May 18, 1994, now abandoned.

BACKGROUND OF THE INVENTION

The present invention relates to a fuse locking construction for a fuse box, in which especially, a miniature fuse can be mounted on and locked to the fuse box easily.

A number of fuses for electric devices are accommodated in a fuse box loaded on a motor vehicle, etc. As one example of such fuses, a fuse 1 shown in FIGS. 1 and 2 includes a rectangular base 2 made of synthetic resin, in which a fuse member 3*a* is insert molded. Furthermore, a pair of terminal plates 3*b* project out of a central portion of an underside of the base 2 from the fuse member 3*a*. Thus, the underside of the base 2 extends beyond the terminal plates 3*b* in lateral and longitudinal directions of the underside of the base 2.

The external shape of the fuse 1 varies according to allowable current. As shown in FIG. 3, a fuse box 4 includes a fuse mounting portion 4*a* in which a large fuse 1A is inserted so as to be locked and a plurality of fuse mounting portions 4*b* in each of which a miniature fuse 1B is inserted so as to be locked. The bases 2 of the miniature fuse 1B are so small as to have, for example, a height of 9 mm, a width of 11 mm and a thickness of 4 mm.

FIGS. 4 to 6 show in detail only the fuse mounting portion 4*b* in which the miniature fuse 1B is inserted so as to be locked. For the fuse mounting portion 4*b*, a pair of locking projections 4*d* are, respectively, provided at opposite ends of an insertion mouth 4*c* of the fuse box 4. When the miniature fuse 1B is inserted into the fuse mounting portion 4*b*, the locking projections 4*d* are depressed outwardly by the terminal plates 3*b* and the base 2 through deflection of opposed outer peripheral walls 4*e*. Meanwhile, when the miniature fuse 1B has been inserted into the fuse mounting portion 4*b*, the locking projections 4*d* retain opposite upper ends of the base 2, respectively by restoring force of the outer peripheral walls 4*e* so as to lock the miniature fuse 1B to the fuse mounting portion 4*b*.

However, since especially, the miniature fuse 1B is quite small, it is difficult to locate the fuse mounting portion 4*b* when the miniature fuse 1B is inserted into the fuse mounting portion 4*b*. Therefore, since it is extremely difficult to insert the terminal plates 3*b* into the fuse mounting portion 4*b* straightforwardly, such a case happens frequently in which the terminal plates 3*b* are inserted into the fuse mounting portion 4*b* obliquely, thereby resulting in poor working efficiency for inserting the miniature fuse 1B into the fuse mounting portion 4*b*. Moreover, for the same reason, such a drawback is incurred that working efficiency for drawing the miniature fuse 1B out of the fuse mounting portion 4*b* is also low.

SUMMARY OF THE INVENTION

Accordingly, an essential object of the present invention is to provide, with a view to eliminating the above described inconveniences inherent in conventional fuse boxes, a fuse locking construction for a fuse box, in which both working efficiency for inserting fuses into fuse mounting portions and working efficiency for drawing the fuses out of the fuse mounting portions are improved.

In order to accomplish this object of the present invention, a fuse locking construction for a fuse box, in which a fuse having a fuse member insert molded in a base made of synthetic resin and a pair of terminal plates projecting out of the base from the fuse member is inserted into a fuse mounting portion so as to be locked to the fuse mounting portion, according to the present invention comprises: a pair of locking projections which are, respectively, provided at opposite ends of an insertion mouth of the fuse box for the fuse mounting portion and retain opposite upper ends of the base at the time of completion of insertion of the fuse into the fuse mounting portion so as to lock the fuse to the fuse mounting portion; and a guide groove for guiding each of the terminal plates of the fuse in a direction for inserting the fuse into the fuse mounting portion or drawing the fuse out of the fuse mounting portion, which is formed on each of the locking projections.

The guide groove is formed at a central portion of each of the locking projections and opposite side portions of the guide groove act as an insertion guide for each of the terminal plates. Furthermore, after the terminal plates have been inserted into the fuse mounting portion along the guide grooves, the base projecting upwardly from the terminal plates is inserted into the fuse mounting portion by deflecting the opposite side portions of each of the guide grooves. Then, after the base has been inserted through the opposite side portions of each of the guide grooves into the fuse mounting portion, the opposite side portions of each of the guide grooves return to the original positions elastically so as to retain an upper face of the base such that the fuse is locked to the fuse mounting portion.

In accordance with the present invention, when the fuse is inserted into the fuse mounting portion of the fuse box, the terminal plate of the fuse is guided by the guide groove of the locking projection in the direction for inserting the fuse into the fuse mounting portion. Therefore, since the fuse can be inserted into the fuse mounting portion straightforwardly, working efficiency for inserting the fuse into the fuse mounting portion is raised.

Meanwhile, when the fuse is drawn out of the fuse mounting portion, the terminal plate of the fuse is guided by the guide groove of the locking projection in the direction for drawing the fuse out of the fuse mounting portion. Thus, since the fuse can be drawn out of the fuse mounting portion straightforwardly, working efficiency for drawing the fuse out of the fuse mounting portion is also improved.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
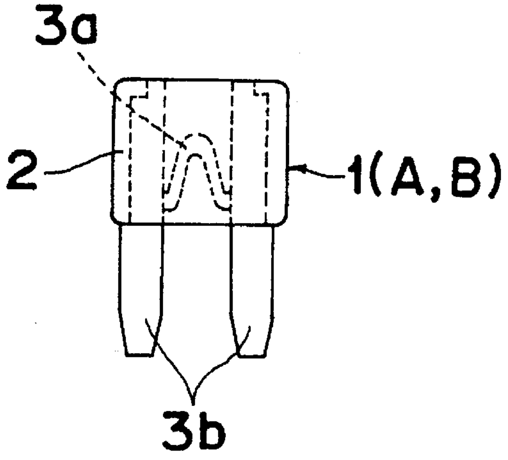
Fig. 1 PRIOR ART
FIG. 1 is a front elevational view of a prior art fuse (already referred to)
Figure 2:
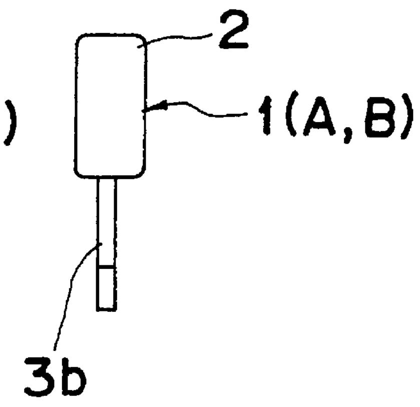
Fig. 2 PRIOR ART
FIG. 2 is a side elevational view of the prior art fuse of FIG. 1 (already referred to)
Figure 3:
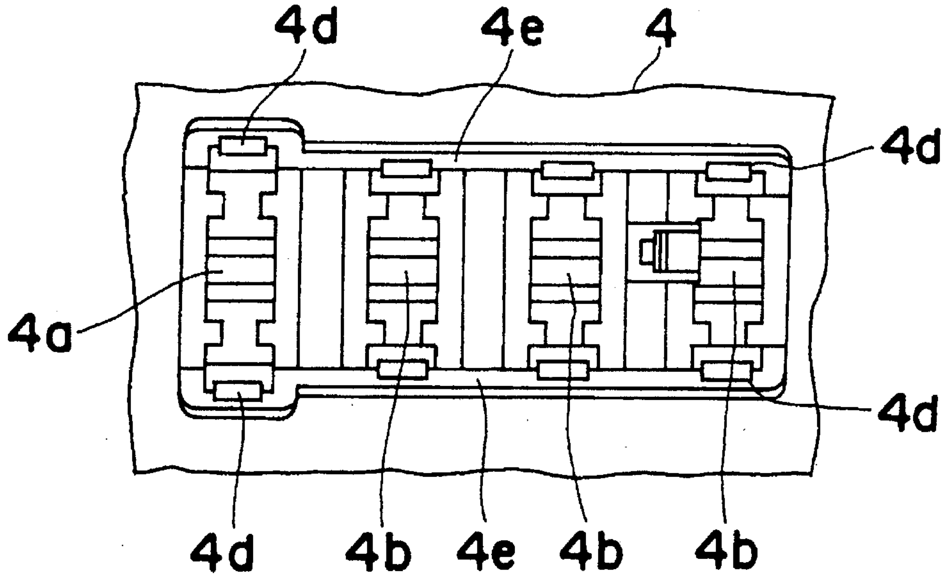
Fig. 3 PRIOR ART
FIG. 3 is a fragmentary top plan view of a prior art fuse box (already referred to)
Figure 4:
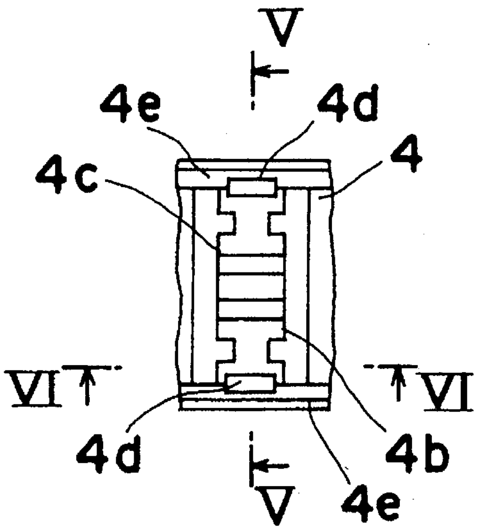
Fig.4 PRIOR ART
FIG. 4 is a top plan view of a fuse mounting portion of the prior art fuse box of FIG. 3 (already referred to)
Figure 5:
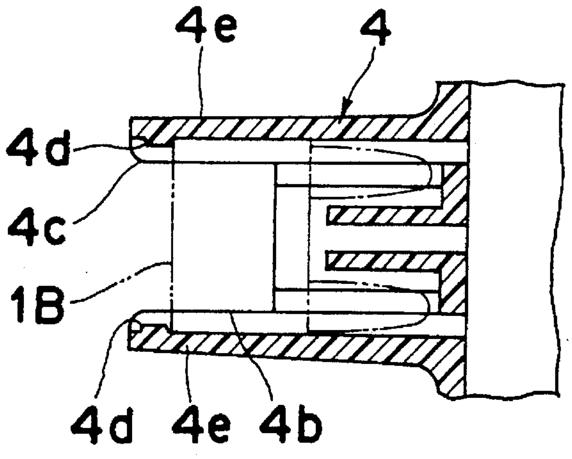
Fig.5 PRIOR ART
FIG. 5 is a sectional view taken along the line V—V in FIG. 4 (already referred to)
Figure 6:
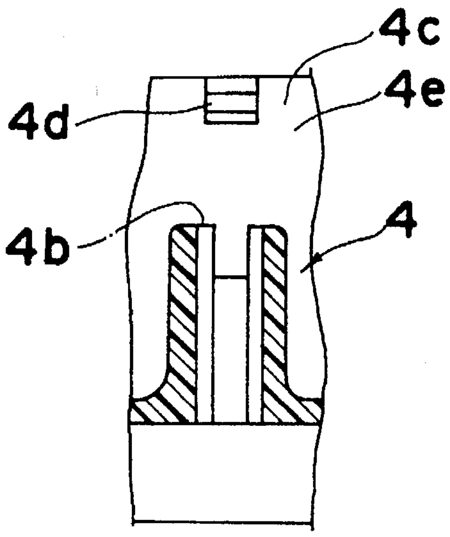
Fig. 6 PRIOR ART
FIG. 6 is a sectional view taken along the line VI—VI in FIG. 4 (already referred to)
Figure 7:
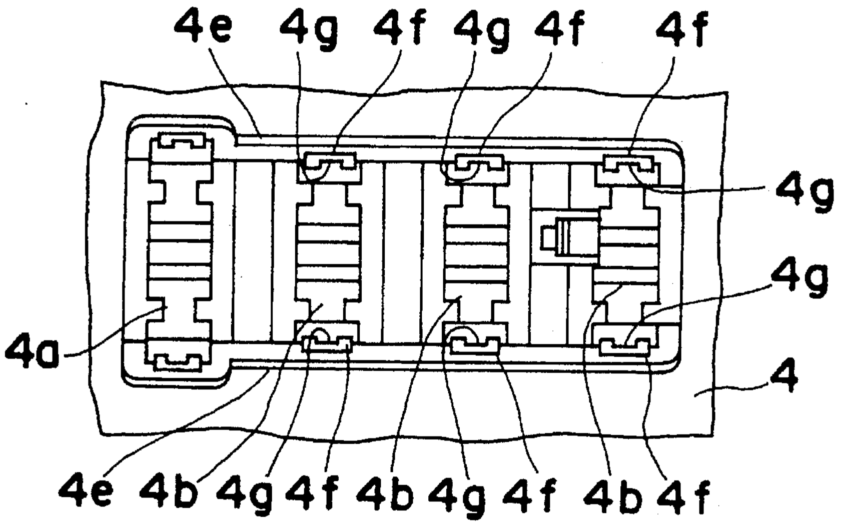
FIG. 7 is a fragmentary top plan view of a fuse box according to the present invention.
Figure 8:
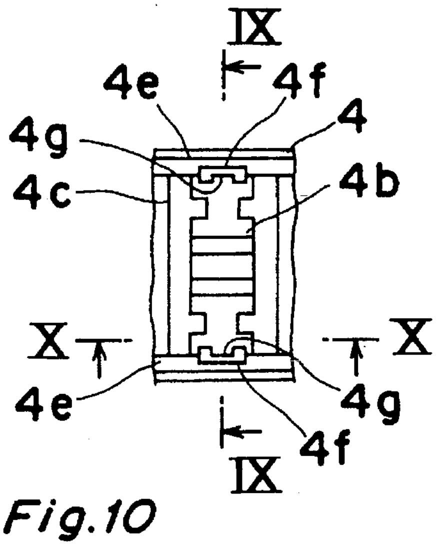
FIG. 8 is a top plan view of a fuse mounting portion of the fuse box of FIG. 7.
Figure 9:
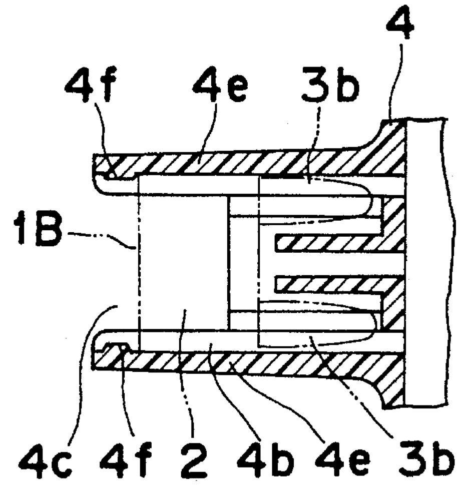
FIG. 9 is a sectional view taken along the line IX—IX in FIG. 8.
Figure 10:
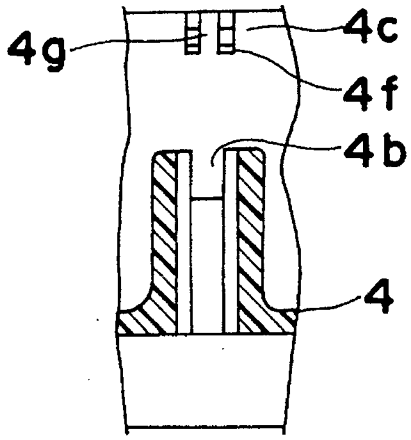
FIG. 10 is a sectional view taken along the line X—X in FIG. 8.

Referring now to the drawings, there is shown in FIGS. 7 to 10, a fuse box 4 according to one embodiment of the present invention. In the fuse box 4, a large fuse 1A and a miniature fuse 1B identical with those shown in FIGS. 1 and 2 are employed. Thus, each of the large fuse 1A and the miniature fuse 1B includes a rectangular base 2 having a fuse member 3*a* insert molded therein and a pair of terminal plates 3*b* projecting out of the base 2 from the fuse member 3*a*. As shown in FIG. 7, the fuse box 4 includes a fuse mounting portion 4*a* in which the large fuse 1A is inserted so as to be locked and a plurality of fuse mounting portions 4*b* in each of which the miniature fuse 1B is inserted so as to be locked. Hereinbelow, only the fuse mounting portion 4*b* for the miniature fuse 1B is described.

For the fuse mounting portion 4*b*, a pair of locking projections 4*f* are, respectively, provided at opposite ends of an insertion mouth 4*c* of the fuse box 4. When the miniature fuse 1B is inserted into the fuse mounting portion 4*b*, opposite end portions of the base 2 of the miniature fuse 1B are, respectively, brought into contact with the locking projections 4*f* so as to depress the locking projections 4*f* outwardly through deflection of opposed outer peripheral walls 4*e*. Meanwhile, when the miniature fuse 1B has been inserted into the fuse mounting portion 4*b*, the locking projections 4*f* return inwardly to their original positions through restoring force of the outer peripheral walls 4*e* so as to retain opposite upper ends of the base 2, respectively such that the miniature fuse 1B is locked to the fuse mounting portion 4*b*.

A guide groove 4*g* for guiding each of the terminal plates 3*b* of the miniature fuse 1B in a direction for inserting the miniature fuse 1B into the fuse mounting portion 4*b* or drawing the miniature fuse 1B out of the fuse mounting portion 4*b* is formed at a lateral central portion of each of the locking projections 4*f*. When each of the terminal plates 3*b* of the miniature fuse 1B has a thickness of 0.8 mm, it is preferable that the guide groove 4*f* has a width of about 1.3 mm.

Figure 11:
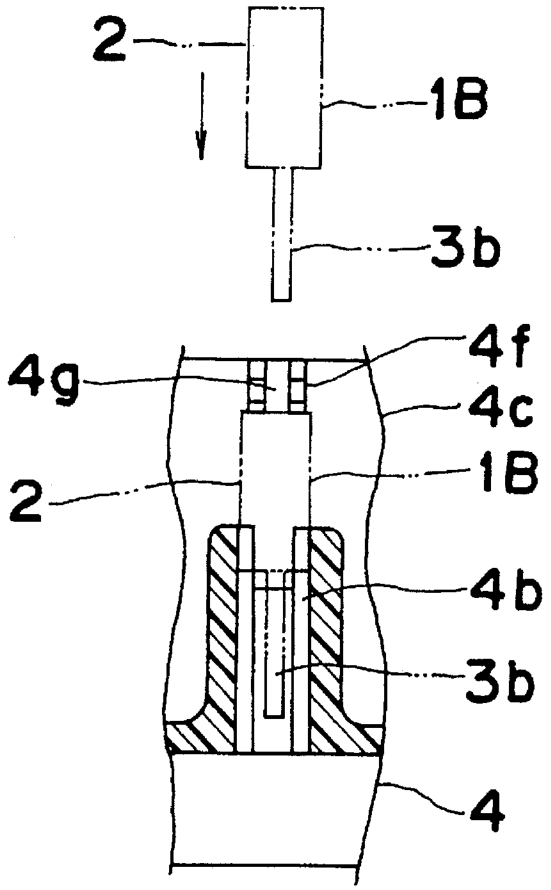
FIG. 11 is a sectional view of the fuse mounting portion of FIG. 8, into which a miniature fuse has been inserted.

By the above described arrangement of the fuse box 4, when the miniature fuse 1B is inserted into the fuse mounting portion 4*b* of the fuse box 4, a distal end portion of each of the terminal plates 3*b* of the miniature fuse 1B is initially fitted into the guide groove 4*g* of the locking projection 4*f* of the fuse mounting portion 4*b* as shown in FIG. 11. Subsequently, when the base 2 is pushed downwardly, each of the terminal plates 3*b* is guided by the guide groove 4*g* in a direction for inserting the miniature fuse 1B into the fuse mounting portion 4*b*, i.e., downwardly in FIG. 11 and thus, can be inserted straightforwardly into the fuse mounting portion 4*b*.

Figure 12:
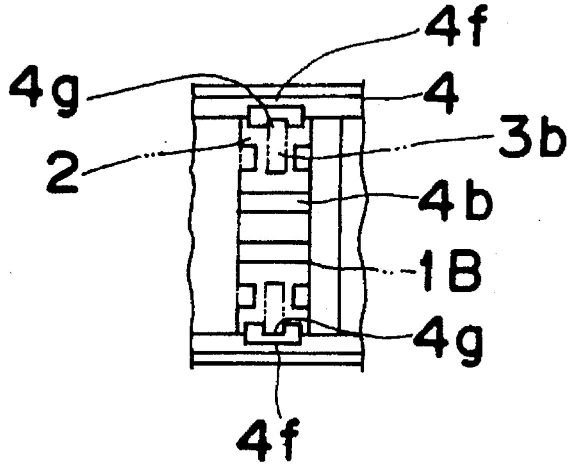
FIG. 12 is a top plan view of the fuse mounting portion of FIG. 8, into which the miniature fuse has been inserted.

After the terminal plates 3*b* of the miniature fuse 1B have been inserted into the fuse mounting portion 4*b*, the base 2 disposed on the terminal plates 3*b* is inserted into the fuse mounting portion 4*b* and thus, the locking projections 4*f* are depressed outwardly by the opposite end portions of the base 2 through deflection of the outer peripheral walls 4*e*. Finally, when the miniature fuse 1B has been inserted into the fuse mounting portion 4*b*, the locking projections 4*f* retain the opposite upper ends of the base 2, respectively so as to lock the miniature fuse 1B to the fuse mounting portion 4*b* as shown in FIG. 12.

On the other hand, in case the miniature fuse 1B inserted into the fuse mounting portion 4*b* of the fuse box 4 is drawn out of the fuse mounting portion 4*b*, the base 2 of the miniature fuse 1B is gripped by a tool such as pliers and the tool is pulled upwardly. As a result, the locking projections 4*f* are depressed outwardly by the opposite end portions of the base 2 through deflection of the outer peripheral walls 4*e* and thus, locking of the miniature fuse 1B to the fuse mounting portion 4*b* is cancelled. Subsequently, each of the terminal plates 3*b* of the miniature fuse 1B is fitted into the guide groove 4*g* of the locking projection 4*f* so as to be guided by the guide groove 4*g* in a direction for drawing the miniature fuse 1B out of the fuse mounting portion 4*b*, i.e., upwardly in FIG. 11, so that the terminal plates 3*b* can be drawn out of the fuse mounting portion 4*b* straightforwardly.

As described above, since the guide groove 4*g* is formed on each of the locking projections 4*f* of the fuse mounting portion 4*b*, the miniature fuse 1B can be straightforwardly inserted into or drawn out of the fuse mounting portion 4*b*, thereby resulting in improvement of working efficiencies for inserting the miniature fuse 1B into the fuse mounting portion 4*b* and for drawing the miniature fuse 1B out of the fuse mounting portion 4*b*.

As is clear from the foregoing description of the fuse locking construction for the fuse box, the guide groove for guiding each of the terminal plates of the fuse in the direction for inserting the fuse into the fuse mounting portion or drawing the fuse out of the fuse mounting portion is formed on each of the locking projections of the fuse mounting portion. Hence, in accordance with the present invention, since the terminal plates of the fuse can be straightforwardly inserted into or drawn out of the fuse mounting portion, working efficiency for inserting the fuse into the fuse mounting portion and working efficiency for drawing the fuse out of the fuse mounting portion can be improved.

What is claimed is:

1. A fuse locking construction for a fuse box having a fuse mounting portion, in which a fuse, having a fuse member molded in a base of synthetic resin, and a pair of terminal plates projecting out of the base from the fuse member, is inserted into the fuse mounting portion of the fuse box so as to be locked to the fuse mounting portion, the fuse locking construction comprising:

a pair of resilient locking projections which are, respectively, provided at opposite ends of an insertion mouth of the fuse mounting portion of the fuse box so as to retain opposite upper ends of the base of the fuse at the time of completion of insertion of the fuse into the fuse mounting portion such that the fuse is locked to the fuse mounting portion; and a guide groove for guiding each of the terminal plates of the fuse in a direction for inserting the fuse into the fuse mounting portion or withdrawing the fuse from the fuse mounting portion, said guide groove being formed as a notch on a face of each of said resilient locking projections.

2. A fuse box for receiving a fuse member, the fuse member comprising a molded synthetic resin base having an upper end and a lower end, a pair of terminal plates extending from the lower end, the fuse member being insertable into the fuse box, said fuse box comprising:

mounting means for receiving the fuse member;

locking means, projecting from opposite ends of said mounting means, for securing the fuse member to said fuse box; and guide means provided in said fuse box, and formed as a notch in said locking means, for creating a channel for inserting the terminal plates of the fuse into said fuse box;

wherein said locking means locks the upper end of the base and secures the fuse member within said fuse box.

3. The fuse box according to claim 2, said locking means comprising a resilient wall, wherein said resilient wall is outwardly deflected when the base is positioned between said locking means and said resilient wall is inwardly deflected when the base is not positioned between said locking means.

4. The fuse box according to claim 2, wherein when the fuse member is secured in said fuse box, said locking means contact the upper end of the base.

* * * * *